United States Patent
Veltman

(10) Patent No.: US 10,138,721 B2
(45) Date of Patent: Nov. 27, 2018

(54) METHOD OF AND A DEVICE AND AN ELECTRONIC CONTROLLER FOR MITIGATING STICK-SLIP OSCILLATIONS IN BOREHOLE EQUIPMENT

(71) Applicant: ENGIE ELECTROPROJECT B.V., Zaandam (NL)

(72) Inventor: Andre Veltman, Culemborg (NL)

(73) Assignee: ENGIE ELECTROPROJECT B.V., Zaandam (NL)

( * ) Notice: Subject to any disclaimer, the term of this patent is extended or adjusted under 35 U.S.C. 154(b) by 901 days.

(21) Appl. No.: 14/354,101

(22) PCT Filed: Oct. 24, 2012

(86) PCT No.: PCT/NL2012/050739
§ 371 (c)(1),
(2) Date: Apr. 24, 2014

(87) PCT Pub. No.: WO2013/062409
PCT Pub. Date: May 2, 2013

(65) Prior Publication Data
US 2014/0284105 A1    Sep. 25, 2014

Related U.S. Application Data

(60) Provisional application No. 61/551,074, filed on Oct. 25, 2011.

(30) Foreign Application Priority Data

Oct. 25, 2011  (NL) .................................... 2007656

(51) Int. Cl.
*E21B 44/00* (2006.01)
*G05D 19/02* (2006.01)
*E21B 41/00* (2006.01)

(52) U.S. Cl.
CPC .......... *E21B 44/00* (2013.01); *E21B 41/0092* (2013.01); *G05D 19/02* (2013.01)

(58) Field of Classification Search
CPC combination set(s) only.
See application file for complete search history.

(56) References Cited

U.S. PATENT DOCUMENTS 8,689,906 B2 * 4/2014 Nessjoen ................ E21B 44/00
175/24
9,482,083 B2 * 11/2016 Doris ...................... E21B 44/00
(Continued)

FOREIGN PATENT DOCUMENTS

WO        2010/063982       6/2010

OTHER PUBLICATIONS

PCT International Search Report dated Jan. 15, 2013 for PCT Application PCT/NL2012/050739 filed on Oct. 24, 2012 in the name of Cofely Experts B.V.
(Continued)

*Primary Examiner* — Omar F Fernandez Rivas
*Assistant Examiner* — Justin C Mikowski
(74) *Attorney, Agent, or Firm* — Steinfl + Bruno, LLP

(57) ABSTRACT

A method for mitigating stick-slip oscillations in borehole equipment while drilling a borehole in an earth formation is described. The borehole equipment is modelled by a computational model for computer simulation. The model has elements representing a particular mechanical and physical behavior of the borehole equipment. In a simulated stick mode of the borehole equipment, physical quantities are loaded to the elements, which quantities represent an initial state of the borehole equipment prior to a transition from stick mode to slip mode. From a simulation of such transition, a time response of rotational speeds of a drive system and bottom hole assembly of the borehole equipment is
(Continued)

recorded and a lower limit of the rotational speed of the drive system is determined for which the rotational driven speed of the bottom hole assembly is zero.

26 Claims, 6 Drawing Sheets

(56) References Cited

U.S. PATENT DOCUMENTS

| | | | | |
|---|---|---|---|---|
| 2003/0015320 | A1* | 1/2003 | Crossley | E21B 47/0007 166/250.15 |
| 2004/0078129 | A1* | 4/2004 | Matsuno | B60K 23/04 701/67 |
| 2004/0245017 | A1* | 12/2004 | Chen | E21B 44/00 175/41 |
| 2011/0106514 | A1* | 5/2011 | Omeragic | G01V 11/00 703/10 |
| 2011/0147083 | A1* | 6/2011 | Mauldin | E21B 44/00 175/50 |
| 2011/0153296 | A1 | 6/2011 | Sadler et al. | |
| 2011/0232966 | A1* | 9/2011 | Kyllingstad | E21B 44/00 175/24 |
| 2011/0280104 | A1* | 11/2011 | McClung, III | E21B 3/02 367/82 |
| 2012/0181084 | A1* | 7/2012 | Pilgrim | E21B 21/01 175/57 |

OTHER PUBLICATIONS

PCT Written Opinion dated Jan. 15, 2013 for PCT Application PCT/NL2012/050739 filed on Oct. 24, 2012 in the name of Cofely Experts B.V.
Halsey, G.W. et al. "Torque Feedback Used to Cure Slip-Slick Motion." SPE International Oil and Gas Conference and Exhibition. Society of Petroleum Engineers. Oct. 2, 1988.
Kyllingstad, A. et al. "Hardware-in-the-loop Simulations Used as a Cost-Efficient Tool for Developing an Advanced Stick-Slip Prevention System." Society of Petroleum Engineers. vol. IADC/SPE, No. 128223. Feb. 4, 2010.
Rudat, J, et al, "Development of an Innovative Model-Based Stick/Slip Control System." Society of Petroleum Engineers. vol. SPE/IADC, No. 139996. Mar. 1, 2011.

* cited by examiner

METHOD OF AND A DEVICE AND AN ELECTRONIC CONTROLLER FOR MITIGATING STICK-SLIP OSCILLATIONS IN BOREHOLE EQUIPMENT

CROSS REFERENCE TO RELATED APPLICATIONS

The present application is the US national stage of International Patent Application PCT/NL2012/050739 filed on Oct. 24, 2012 which, in turn, claims priority to Dutch Patent Application NL 2007656 and U.S. Provisional Patent Application 61/551,074 both filed on Oct. 25, 2011.

TECHNICAL FIELD

The present invention generally relates to borehole equipment for drilling a borehole in an earth formation. More specifically, the present invention relates to a method of and a device and an electronic controller for mitigating stick-slip oscillations in such borehole equipment while drilling a borehole, as well as borehole equipment equipped with and operating in accordance with this method, device or electronic controller.

BACKGROUND

The term borehole generally designates the result of a drilling operation in the earth, either vertically, horizontally and/or deviated using a drill string, comprising a drill bit at its lower end. At its upper end or top end, the drill string is driven by a drive system at the surface, called a top drive or rotary table. The top drive or rotary table is driven by an electric motor, or any other type of drive motor, providing a rotational movement to the drill bit in the borehole.

Typically, the drill string is a very slender structure of a plurality of tubulars or pipes, threadedly connected to each other, and may have a length of several hundreds or thousands of meters.

The lower part of the drill string is called the bottom hole assembly, BHA, and consists of heavier thick-walled pipes, called drill collars, at which the drill bit rests.

The drill string is hollow, such that drilling fluid can be pumped down towards the bottom hole assembly and through nozzles in the bit, for lubrication purposes. The drilling fluid is circulated back up the annulus, i.e. the space between the outer circumference of the drill string and the borehole wall, to transport cuttings from the bit to the surface.

A borehole may be drilled for many different purposes, including the extraction of water or other liquid (such as oil) or gases (such as natural gas), as part of a geotechnical investigation, environmental site assessment, mineral exploration, temperature measurement or as a pilot hole for installing piers or underground utilities, for example.

The bottom hole assembly is rigid in torsional direction as it is relatively short and thick-walled and in use experiences lateral deflections due to compressive force. The drill string is an extreme flexible structure due to its long length and relative small wall thickness, such that during drilling numerous vibrations are induced in the borehole equipment and, in particular, in the drill string. In the case of a rotary drill string and bottom hole assembly, torsional, axial and longitudinal or lateral vibrations may be induced.

Axial vibrations can cause bit bounce, which may damage bit cutters and bearings. Lateral vibrations are very destructive and can create large shocks as the bottom hole assembly impacts the wall of the borehole. Lateral vibrations may drive the system into backward whirl, creating high-frequency large-magnitude bending moment fluctuations, that result in high rates of component and connection fatigue. Imbalance in an assembly may cause centrifugally induced bowing of the drill string, which may produce forward whirl and result in one-sided wear of components. Torsional vibrations result, among others, in stick-slip motions or oscillations of the drill string alongside the borehole.

Stick-slip is a phenomenon caused by frictional forces between surfaces of the drill bit and/or the drill string contacting the earth formation or the inner wall of the borehole. The surfaces alternatingly may stick to each other or slide over each other, with a corresponding change in the force of friction. In extreme cases, the friction may become so large that the drill bit, i.e. the bottom hole assembly, temporarily comes to a complete standstill, called the stick mode. During the stick mode, the continuing rotational drive speed or motion of the drive system winds-up the drill string. If the torque build-up in the drill string is large enough to overcome the friction, the bottom hole assembly starts rotating again, called the slip mode. This, however, may cause a sudden jump or a stepwise increase in the angular acceleration of the movement of the drill bit and may result in excessive wear thereof. Stick and slip modes may follow each other rather quickly in an oscillating like manner.

Stick-slip is also a major source of problems causing equipment failures if the drill string, due to the rotary oscillations induced therein, starts to build-up a negative torque, i.e. a torque in the opposite direction compared to the direction of rotation of the drive system. When negative torque exceeds a friction threshold, pipe-connections will tend to unscrew.

When stick-slip occurs, the effectiveness of the drilling process is affected, such that a planned drilling operation may be delayed over as much as a few days, with the risk of penalty fees and the like.

Accordingly, in various situations it is required to control the effect of stick-slip oscillations in borehole equipment, thereby mitigating as much as possible the above outlined problems.

Mitigating the stick-slip phenomenon has been the subject of many studies and patent publications. International patent application WO 2010/063982, for example, suggests damping of stick-slip oscillations based on a frequency or wave propagation transmission line approach, by operating the speed controller having its frequency dependent reflection coefficient of torsional waves set to a minimum at or near the frequency of the stick-slip oscillations.

A problem with this known approach is that in stick mode, in which the bottom hole assembly comes to a complete standstill, the frequency approach fails to correctly describe the physical behaviour of the borehole equipment, as the speed of the bottom hole assembly obviously equals zero. Further, in practice, the bottom hole assembly rotates at relative low speeds, which makes a sufficient accurate sinusoidal waveform approach more difficult, and because a real drilling system shows a non-linear behaviour.

SUMMARY

It is an object to provide a method of mitigating stick-slip oscillations in borehole equipment for drilling a borehole in an earth formation.

It is another object to provide a device for mitigating stick-slip oscillations in borehole equipment for drilling a borehole in an earth formation.

It is a further object to provide an electronic controller for controlling rotational speed of a rotational drive system for mitigating stick-slip oscillations in borehole equipment for drilling a borehole in an earth formation.

It is also an object of the invention to provide borehole equipment for drilling a borehole in an earth formation operating in accordance with the method and/or equipped with the device or electronic controller.

In the present description and claims, the term "mitigating" when used in connection with stick-slip oscillations, has to be construed to include controlling, alleviating, reducing, soften, tempering, relieving, and like meanings, up to and including avoiding stick-slip oscillations.

In a first aspect there is provided a method of mitigating stick-slip oscillations in borehole equipment for drilling a borehole in an earth formation. The borehole equipment comprising a drill string having a bottom hole assembly and a top end coupled to a rotational drive system, and a speed controller for controlling rotational drive speed of the drive system.

The method comprising the steps of:
operating the speed controller such that the drive speed is above a lower drive speed limit while drilling a borehole by the borehole equipment, wherein the lower drive speed limit is determined from:
modelling the borehole equipment by an equivalent computational model for computer simulation,
loading elements of the model with physical quantities representing an initial state of the borehole equipment causing a transition of the bottom hole assembly from stick mode to slip mode,
simulating in the loaded model a transition representative of the transition of the bottom hole assembly from stick mode to slip mode,
registering relaxation dynamics in the model from said simulating step representing rotational driven speed of the bottom hole assembly, and
determining from the relaxation dynamics the lower drive speed limit as a drive speed for which the rotational driven speed of the bottom hole assembly is zero.

The method is based on the insight that stick-slip oscillations in the borehole equipment have to be analysed in the time domain rather than in the frequency domain, in order to take stepwise transitions from stick mode to slip mode into account.

By applying physical quantities to the elements of the computer model representing actual borehole equipment, such that same comply to the initial state of the borehole equipment prior to the transition from stick mode to slip mode, transitional effects in the borehole equipment can be simulated, measured and visualised.

By applying a step response from the thus loaded model of the borehole equipment simulating a break-loose event of the bottom hole assembly, i.e. a sudden transition from the stick mode to the slip mode, it has been observed that the system typically shows a time behaviour or relaxation dynamics of a dynamic system. That is, a transitional phase occurs wherein the rotational speed of the bottom hole assembly experiences an overshoot followed by an undershoot with respect to a steady state. Stick-slip occurs if the rotational speed of the bottom hole assembly, due to the undershoot value, becomes zero or near zero. It is this re-occurrence of the bottom hole assembly rotational speed becoming zero or near zero that causes stick-slip oscillations in the borehole equipment.

By registering the relaxation dynamics in the loaded system from applying the step response, a minimum rotational speed or critical speed of the drive system is determined at which the rotational speed of the bottom hole assembly equals zero. The rotational speed of the drive system is set to remain above the lower limit or critical speed, such that the rotational speed of the bottom hole assembly remains above zero.

With the method according to the invention, the speed controller's parameters are evaluated and chosen in an optimal way where the total systems dynamic behaviour will be most robust, thereby mitigating stick-slip oscillations while drilling a borehole by the borehole equipment.

In an embodiment the speed controller is operated such that the drive speed during steady operation of the drive system is as low as possible but above the critical speed. This allows an operator to drill at a low speed maintaining a relatively high weight on bit, WOB, while mitigating as much as possible stick-slip and whirl, because the latter hardly occurs at a relatively low rotational speed of the bottom hole assembly.

In its simplest embodiment, the simulation is performed such that the physical quantities that represent the initial state of the borehole equipment comprise a pre-wound drill string as a result of a stick mode of the bottom hole assembly.

It has been observed that modelling of the mechanical properties of the drive motor, the drill string and the bottom hole assembly as well as the properties of the speed controller may result in a determination of a critical drive speed that is sufficiently accurate for many drilling operations. An even more accurate determination of the lower limit of the rotational speed of the drive system is obtained wherein the modelling includes a representation of an actual earth formation in which the borehole is drilled and the drilling fluid or mud used for drilling purposes.

That is, by taking into account the influence of an actual earth formation and the drilling fluid or mud in the modelling of an actual borehole to be drilled, the time behaviour of the borehole equipment can be even more accurately simulated, resulting in a more accurate determination of the critical speed and the time response of the system as a whole.

In a first approximation, a linear computer simulation model of the drill string may be used. It has been found that such a linear model provides practical results with the benefit of less stringent requirements to computer processing power and storage capacities. A second order linear model of the drill string suffices in most cases.

For the purpose of the present invention, the simulation model may be selected from a range of known computational models for computer simulation of dynamic systems, in order to simulate the dynamics of the borehole equipment as accurate as possible.

In an embodiment, an electrical equivalent circuit diagram is used as a computer simulation model. However, likewise an equivalent non-linear mechanical model may be used or a state-space model or a dynamic simulation model.

The step of determining the lower drive speed limit as the drive speed for which the rotational driven speed of the bottom hole assembly is zero, may include further optimization by reiterating the loading, simulating and registering steps using adapted physical quantities and model parameters.

As will be appreciated, each time when extending the drill string with a further tubular section or sections, the dynamics of the borehole equipment and in particular of the drill string will change. Accordingly, to remain ahead of stick-slip, the steps of simulating a stick mode, a slip mode and determining the lower limit of the rotational speed of the drive system are ideally repeated each time after part of the borehole equipment has been modified. It goes without saying that the speed controller will be operated in accordance with a thus determined value of the lower rotational speed limit of the drive system.

Those skilled in the art will appreciate that other modifications to the borehole equipment and/or encountering new earth formations or when the path of the drill string during drilling deviates, may also need to re-establish an updated lower limit of the rotational drive speed. Of course, dependent on the simulation model used.

In an embodiment, wherein the speed controller comprises a PI controller, having a proportional action, P, and an integral action, I, P and I are set such to decrease the lower drive speed limit when applying the step response. The speed controller is operated applying the set integral action while drilling a borehole by the borehole equipment.

It has been observed that the invention permits operation of the drive system at an even lower critical speed with a compensated mechanical inertia combined with a decreased integral action, while effectively mitigating occurrence of stick-slip. Accordingly, the range of rotational operation speeds of the borehole equipment increases by this measure.

The speed controller, in a further embodiment, comprises an additional integral action. This additional integral action is set such to speed up settling of the driven speed of the bottom hole assembly when applying the step response, wherein the speed controller is operated applying the set integral action while drilling a borehole by the borehole equipment.

This additional integral action helps to speed up the drive motor when encountering a prolonged stick situation in which the drill string will faster wind-up to create a break-loose event of the bottom hole assembly from a stick mode in less time.

In an embodiment, the additional integral action is set proportional to a spring-constant or spring stiffness of the drill string modelled as a torsional spring.

In another embodiment, inertia compensation of the drive system is provided. The inertia compensation operates on acceleration in the rotational speed of the drive system while drilling a borehole by the borehole equipment. This inertia compensation helps to speed up the drill string directly after the break-loose event.

The above disclosed steps of modelling, loading, simulating, registering, and determining may be performed in a system for computer simulation separate and/or remote from the borehole equipment, such as a computer system on-line connected to the speed controller.

Parameter values for the several elements making up the simulation model can be obtained beforehand and electronically stored in a table or the like and/or calculated from approximation models for borehole equipment, as known to those skilled in the art.

In a further aspect, there is provided a device for mitigating stick-slip oscillations in borehole equipment for drilling a borehole in an earth formation. The borehole equipment comprises a drill string having a bottom hole assembly and a top end coupled to a rotational drive system, and a speed controller for controlling the rotational drive speed of the drive system. The speed controller is arranged for operating the drive system such that the drive speed is above a lower drive speed limit while drilling a borehole by the borehole equipment.

The device further comprises a system for computer simulation arranged for:

modelling the borehole equipment by an equivalent computational model for computer simulation, loading elements of the model with physical quantities representing an initial state of the borehole equipment causing a transition of the bottom hole assembly from stick mode to slip mode, simulating in the loaded model a transition representative of the transition of the bottom hole assembly from stick mode to slip mode, registering relaxation dynamics in the model from the step response and representing rotational driven speed of the bottom hole assembly, and determining from the relaxation dynamics the lower drive speed limit as a drive speed for which the rotational driven speed of the bottom hole assembly is zero.

The system for computer simulation is arranged for applying the method of the invention as disclosed above and may be located physically separate from the borehole equipment, i.e. the speed controller, such as a remote computer simulation system. The remote computer system may be on-line connected to the speed controller for controlling same such to maintain the rotational speed of the drive system above the determined lower limit.

The system for computer simulation may connect to an electronic library comprising mechanical, electrical and other system data of actual borehole equipment, earth formations, drilling fluids and the like, for determining the lower rotational speed limit of the drive system. A control interface may be provided for input and output of simulation data for determining the lower rotational speed limit by a drill operator, for example.

In an embodiment of the device, the speed controller comprises a PI controller, having a proportional action, P, and an integral action, I, and a controller providing an additional integral action for operating the drive system to speed up settling of the driven speed of the bottom hole assembly while drilling a borehole by the borehole equipment, in particular when entering a stick mode from a slip mode.

In another embodiment of the device, the speed controller comprises an inertia compensator arranged to operate on acceleration in the rotational speed of the drive system for providing inertia compensation of the drive system while drilling a borehole by the borehole equipment, in particular when entering a stick mode from a slip mode.

The inertia compensator provides for mass compensation of the drive system, such that the drill string speeds up more quickly directly after a break-loose event.

In an embodiment of the device, the speed controller is an electronic controller implemented as a PII controller In another aspect, the invention provides an electronic controller for controlling rotational drive speed of a rotational drive system in borehole equipment for drilling a borehole in an earth formation, which borehole equipment comprising a drill string having a bottom hole assembly and a top end coupled to the rotational drive system, wherein the electronic controller comprises a drive speed limiting device having a memory for storing a lower drive speed limit of the drive speed obtained from the method according to the invention. The speed limiting device is set to limit the rotational speed of the drive system to be equal or above the determined critical speed.

In an embodiment, the electronic controller comprises a PI controller, having a proportional action, P, and an integral action, I, for operating the drive system, and comprising a control unit providing an additional integral action for operating the drive system to speed up settling of the rotational speed or driven speed of the bottom hole assembly, and/or an inertia compensator arranged to operate on acceleration in the drive speed of the drive system for providing inertia compensation of the drive system, while drilling a borehole by the borehole equipment, in particular when entering a stick mode from a slip mode. The electronic controller as whole can be designated a PII controller.

The invention also provides borehole equipment for drilling a borehole in an earth formation, the borehole equipment comprising a drill string having a bottom end driving a bottom hole assembly and a top end coupled to a rotational drive system, and a device for mitigating stick-slip oscillations in the borehole equipment by controlling rotational speed of the drive system, as disclosed by the present application.

The borehole equipment may be any of new equipment or borehole equipment upgraded with any of the method, device and electronic controller for mitigating stick-slip oscillations in accordance with the present invention.

The above-mentioned and other features and advantages of the invention will be best understood from the following detailed description referring to the attached drawings. In the drawings, like reference numerals denote identical parts or parts performing an identical or comparable function or operation.

Although the examples presented relate to a specific computer simulation model using MATLAB™ as a computer simulation software program, the method, device, electronic controller and borehole equipment disclosed in the summary part of the present application are not to be construed as limited to this type of model and computer simulation software program. To the contrary, the invention may be applied with any commercially available computer simulation program for simulating time behaviour of a dynamic system, such as CASPOC™.

DETAILED DESCRIPTION

Figure 1:
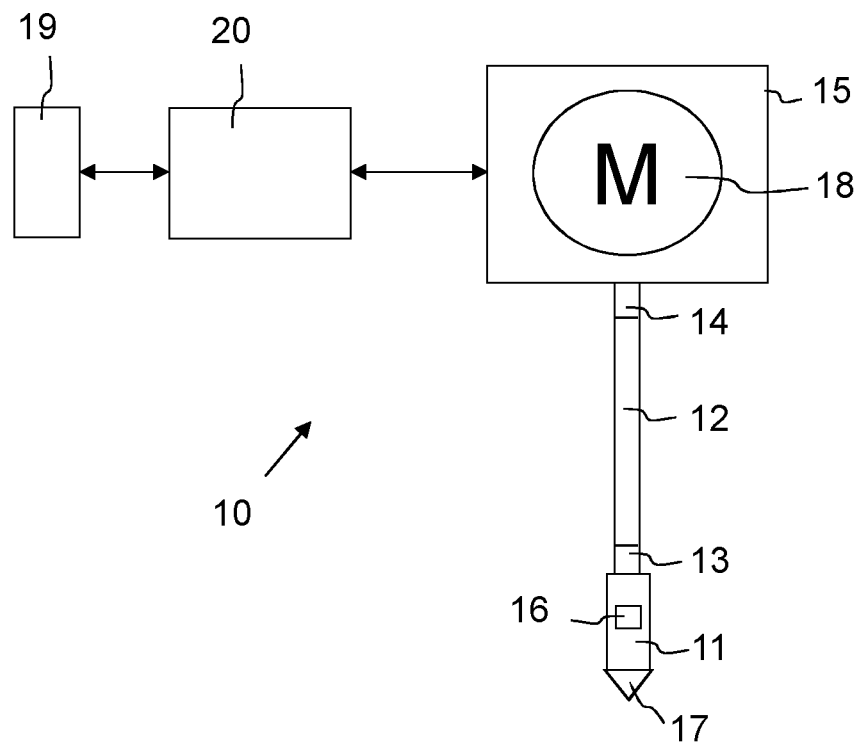
FIG. 1 is a very schematic representation of prior art borehole equipment for drilling a borehole in an earth formation.

FIG. 1 shows, in a very schematic manner, a typical borehole equipment 10 of a drilling rig for drilling a borehole in an earth formation. The cutting tool to drill those boreholes is called the drill bit 17 and connects to a bottom hole assembly, BHA, 11 at a bottom end 13 of a drill string 12. At a top end 14 thereof, the drill string 12 is coupled to a rotational drive system 15.

The drill string 12 comprises lengths of hollow tubulars or drill pipes, threaded together end by end. A typical drill string is several kilometers long, such as 0-10 km, and the drill pipe may have an outer diameter of about 100-300 mm and a wall thickness of about 10-50 mm. The BHA 11 consists of heavier pipes that may have an outer diameter of about 250-500 mm and a wall thickness of about 100 mm, for example, called drill collars. The length of the BHA is typically in the range of 100-300 m. The drill string 12 is very slender compared to its length.

Although not shown, in an actual drilling operation drilling fluid is pumped through the drill pipes of the drill string 12 towards the drill bit 17 for cooling and lubrication of the drill bit 17. Cuttings from the drilling operation are returned back up to the surface by the drilling fluid flowing through the annulus formed between the outer circumference of the drill string 12 and the borehole (not shown).

The bottom hole assembly 11 comprises several sensors and transmitters 16 and a directional tool (not shown) for directing the bottom hole assembly 11 to drill a borehole in a certain direction in the earth formation, such as vertical, horizontal or deviated at an angle and, of course, combinations thereof.

The drive system 15 comprises a rotary drive system motor 18, also called top drive or rotary table, to rotate the drill string 12, the BHA 11 and thereby the drill bit 17. Nowadays the drive system motor generally is an electric motor, for example an 800 kW induction motor powered by a power converter. However, the present invention is equally applicable with a synchronous machine, a brushed DC machine, diesel engine, a hydraulic motor, or the like. Although not explicitly shown, between the drive system motor 18 and the drill string 12 a gearbox may connect, having a particular gear reduction or a range of gear reductions.

In use, at its top end 14 the drill string 12 is pulled upward with the drawworks. On the bottom end 13 the BHA 11 is resting with the drill bit 17 at the earth formation. The slender drill pipes of the drill string 12 are constantly in tension, while the thick-walled lower part of the BHA 11 is partly in compression. The tension in the drill pipes avoids buckling of the drill pipe section. The torsional rigidity of the drill pipe section is, however, relatively small due to its slender construction. The BHA ills rigid in torsional direction but encounters lateral deflections due to compressive force acting on the drill bit 17.

Drilling data and information are displayed at a console 19 comprising a display or other data output device (not shown) and an input device such as a keyboard, touch screen and the like (not shown) by which, through an intermediate speed controller 20, a driller may control rotational speed of the drive system 15 and/or a torque limit for the drive system 15 for controlling the rotational speed of the drill bit 17.

In practice, several types of speed controllers 20 have been developed and used, the control operation of which complies to a well-known PI controller, operable for providing a type of proportional action, P, and a type of an integral action, I. In the case of an electric drive system motor 18, for example, the speed controller 20 may be arranged to operate on a feedback from any or all of measuring variables such as the drive motor current, the rotational speed of the drive motor, and fluctuations in the drive motor current and rotational speed. This, for example, to control the energy flow in the drive system 15 by controlling any or both of these variables.

Although the drive system 15 may operate in different modes, such as a so-called spinning mode and make-up mode, the present invention is directed to the drill-mode, during which the driller aims to effectively grind or cut away material from an earth formation or geological formation by pushing and turning the drill bit 17 and flushing the borehole with drilling fluid or mud.

Experience shows that a relatively constant rotational speed of the drill bit 17 is optimal for effective earth penetration, low drill-wear, nearly no whirl vibrations, and good steering conditions for the bottom hole assembly 11. Common steady state rotational drill speeds are a little higher as 100 rpm with a drive torque exercised on the drill bit 17 dependent on a set weight on bit, WOB.

During drilling, as a result of the mechanical contact of the drill string 12 and/or the drill bit 17 with the geological formation in the borehole and its surroundings, the drill string 12 and the drill bit 17 encounter fluctuations in the force of friction. The friction forces on the drill bit 17 and bottom end part 13 of the drill string induce a frictional torque that may cause torsional stick-slip vibrations, due to the torsional flexibility of the drill pipes of the drill string 12 which mainly expresses itself as a torsional spring with a particular spring-constant or string stiffness $K_s$ [Nm/rad]. The drive system 15, because of its significant inertia $J_d$ [kgm$^2$], does not respond immediately to such friction force fluctuations.

As a result of this, during steady operation of the drill bit 17, an increase in friction causes the drill bit 17 to slow down and, in the most severe case, the drill bit 17 may come to a complete standstill. When the drill bit 17 comes to a standstill, or a near standstill, called the stick-mode, the drive system 15, controlled by the speed controller 20, will continue to rotate and drive the drill string 12. Because the bottom hole assembly 11 does not or ample rotate, the spring-like behaviour of the drill string 12 causes that the drill string 12 winds-up by which the torque on the bottom hole assembly 11 increases till a level that overcomes the break-loose friction. At this point in time the bottom hole assembly 11 and drill bit 17 start rotating again, called the slip-mode.

Figure 2:
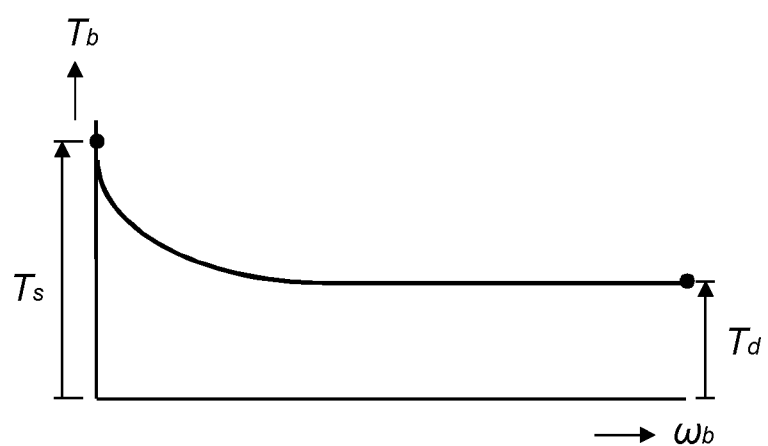
FIG. 2 shows a typical rotational speed vs. torque curve of stick-slip on the bottom hole assembly of a borehole equipment.

The non-linear graph shown in FIG. 2 represents, by way of example, the friction torque $T_b$ [Nm] on the drill bit as a function of its rotational speed $\omega_b$ [rad/s] during stick-slip operation of the drill bit. Due to its illustrative nature, no particular values of the parameters are indicated in FIG. 2.

At a complete standstill, i.e. in stick-mode $\omega_b=0$, $T_s$ represents the value of the drive torque at which the friction in the stick-mode is overcome, also called the break-loose torque. The torque in steady state, at reasonable rotational speed of the drill bit, is designated $T_d$. A valid assumption is $T_s \approx 2 T_d$. It may be assumed that both $T_d$ and $T_s$ depend on weight on bit in an almost linear fashion.

From FIG. 2 the stick-slip dynamics can be envisaged. If the drill bit and/or the drill string during steady operation, i.e. drill bit torque $T_d$, encounter an increased friction, the drill bit slows down till the drive torque $T_b$ on the drill bit increases and $T_s$ is reached at which the drill bit breaks-loose. As a result of which, the rotational speed $\omega_b$ of the drill bit shoots up and the torque on the drill bit decreases till the value $T_d$ that is too less to overcome the friction and the drill bit slows down, such that the stick-slip cycle repeats itself.

Note that the drill bit does not necessarily has to come to a complete standstill, i.e. $\omega_b=0$ rad/s, but may slow down to angular rotational speeds as less as 0.1 rad/s, for example.

It has been observed that such stick-slip oscillations are very detrimental to the operational life of the drill bit, the effectiveness of the borehole operation as a whole and are a major cause for severe vibrations in the borehole equipment, leading to an increased damage and risk of unthreadening of the drill pipes making up the drill string.

An important observation is that there is no such thing as a constant stick-slip oscillation frequency. It has been observed that when the top end speed of the drill string is slowly reduced, in stick-slip mode, the time between subsequent drill-bit rotational speed surges increases. This can been understood in that when the top end speed decreases, the drill string winds-up more slowly, such that the time at which the break-loose torque is reached also increases. This non-linear behaviour and the very low rotational speed of the drill bit or bottom hole assembly up to and inclusive zero prohibit a reliable frequency or wave approach for solving the stick-slip phenomenon.

Figure 3:
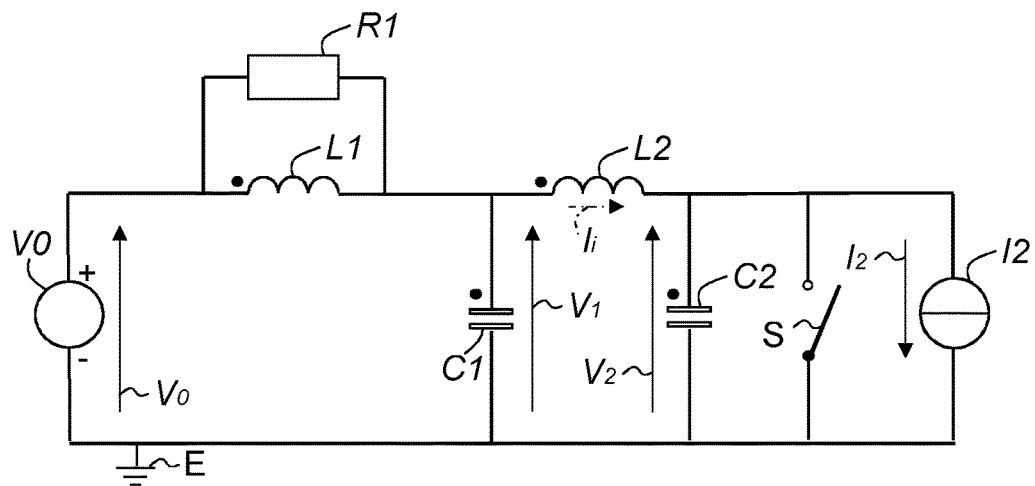
FIG. 3 is a schematic electrical equivalent circuit diagram forming a computational model for computer simulation of a stick-slip condition of the borehole equipment of FIG. 1 in accordance with the invention.

FIG. 3 is a schematic electrical equivalent circuit diagram comprising electrical elements forming a computational model for computer simulation of a stick-slip condition of the borehole equipment of FIG. 2 in accordance with the invention.

In the model of FIG. 3 the drill string 12, mainly operating as a torsional spring, is modelled as an inductor L2 with an inductance value $L_2=1/K_s$ [H]. The inertia of the drive system 15 is modelled as a capacitor C1 with a capacitance value $C_1=J_d$ [F]. The inertia of the bottom hole assembly is modelled as a capacitor C2 with a capacitance value $C_2=J_b$, wherein $J_b$ is the inertia of the bottom hole assembly 11. In the model of FIG. 3a the inductor L2 series connects the capacitors C1 and C2.

The speed controller 20 is modelled as a conventional PI controller, comprising a reference speed source $\omega_0$ represented by a DC voltage source V0, having a voltage value $V_0=\omega_0$ [V], and series connected to the capacitor C1 and the inductor L2 by an intermediate parallel inductor/resistor circuit, i.e. inductor L1 having an inductance value $L_1=1/K_I$ [H] representing the integral, I, action equivalent to a stiffness $K_I$ [Nm/rad], and resistor R1 having a resistance value $R_1$ [Ω] representing the proportional, 1/P, action equivalent to a damping of $C_f$ [Nms/rad] provided by the speed controller 20.

In the model or equivalent circuit diagram of FIG. 3 the rotational speed of the drive system 15, $\omega_d$, equals the voltage $V_1$ across capacitor C1 and the rotational speed of the bottom hole assembly 11, $\omega_b$, equals the voltage $V_2$ across capacitor C2. The torque $T_b$ exerted on the bottom hole assembly 11 is modelled by a current source I2 having a current value $I_2$ [A].

In the transition from stick mode to slip mode, in FIG. 3, switch S opens, providing current $I_2$ to flow into capacitor C2. This represents a step in the BHA acceleration, starting from standstill. Switch S closes when $V_2$ becomes zero. Switch S opens when the torque, i.e. represented by $I_2$, exceeds $T_d$.

Figure 4:
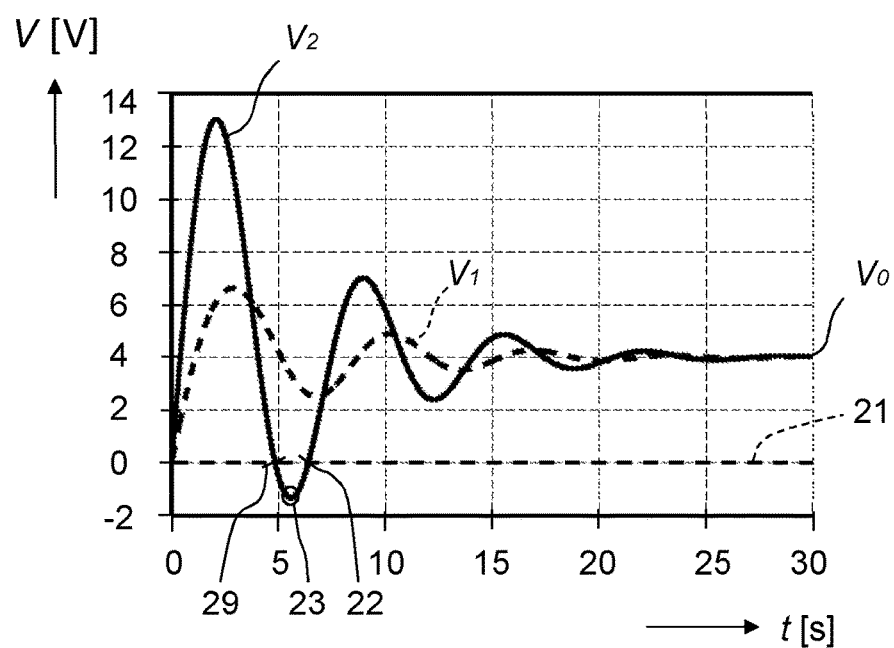
FIG. 4 shows simulated time behaviour of the rotational speed of the drive system and the bottom hole assembly obtained for the model of FIG. 3 for a transition from stick mode to slip mode for tuned system settings.

FIG. 4 shows a simulated time behaviour of the rotational speed of the drive system 15 and the bottom hole assembly 11 obtained for the model of FIG. 3, for a transition from stick mode to slip mode for tuned system settings. The time t [s] runs along the horizontal axis and the voltage V [V] or rotational speed ω runs along the vertical axis. A voltage or rotational speed equal to zero is indicated by a dashed horizontal line 21 in the graph of FIG. 4.

In the simulation shown in FIG. 4 the following values apply for the several electrical components of FIG. 3:

$V_0=4V \div \omega_0=4$ rad/s
$C_1=2000$ F $\div J_d=2000$ kgm$^2$
$C_2=500$ F $\div J_b=500$ kgm$^2$
$L_1=0.0005$ H $\div K_f=2000$ Nm/rad
$L_2=0.002$ H $\div K_s=500$ Nm/rad
$R_1=0.0005\Omega \div C_p=2$ kNms/rad
$I_2=5$ kA $\div T_d=5$ kNm A mud torque of 5 kNm is assumed, represented by an $I_2$ of 5 kA in the equivalent circuit diagram. The earth formation causing the stick-slip mode is modelled by a switch S2 parallel to capacitor C2. A closed (i.e. current conducting) position of this switch S2 simulates a voltage $V_2$ equal to zero, which is equivalent to a zero speed $\omega_b$ of the bottom hole assembly, i.e. a complete standstill of the drill bit 17.

The above settings are representative for borehole equipment 10 when drilling a straight, vertical borehole in a calcareous like earth formation, for example. Those skilled in the art will appreciate that other settings arte feasible, such as a different value for the simulated mud torque, for example.

In accordance with the invention, it is assumed that the drill spring 12 is pre-wound with an initial condition that represents a torque of 10 kNm, just before the stick mode terminates and transits into the slip mode. In the tuned electrical model of FIG. 3 this is represented by an initial current $I_i$ of 10 kA loaded into the inductor L2. This initial current $I_i$ is shown in FIG. 3 by a dash-dot line. In the terms of the introductory part, the element L2, i.e. the inductor in the model, is loaded with a physical quantity, i.e. an initial current of 10 kA.

The transition from stick mode to slip mode is simulated by opening the switch S, i.e. bringing same in its non-current conducting position. However, when simulating with a pre-wound string, S can be considered open at t=0, such that no switch operation need to be simulated.

From the simulated time behaviour of the rotational speed $\omega_d=V_i$ of the drive system 15, i.e. the dashed line in FIG. 4, and the rotational speed $\omega_b=V_2$ of the bottom hole assembly 11, i.e. the solid line in FIG. 4, one will immediately recognize that after the transition from stick mode to slip mode at t=0, the rotational speed of the bottom hole assembly 11 crosses zero, indicated by reference numerals 29 and 22 and even reverses rotational speed, i.e. a negative voltage $V_2$, indicated by reference numeral 23.

In order to mitigate stick-slip, the bottom hole speed $\omega_b$ should not get too close to zero and certainly should not go beneath zero, as shown by $V_2$ from the relaxation dynamics in FIG. 4.

If no stick mode occurs, it will be evident that the rotational speed of the drive system and the rotational speed of the bottom hole assembly, in the steady state mode, are equal to the applied reference rotational speed $V_0$.

Figure 5:
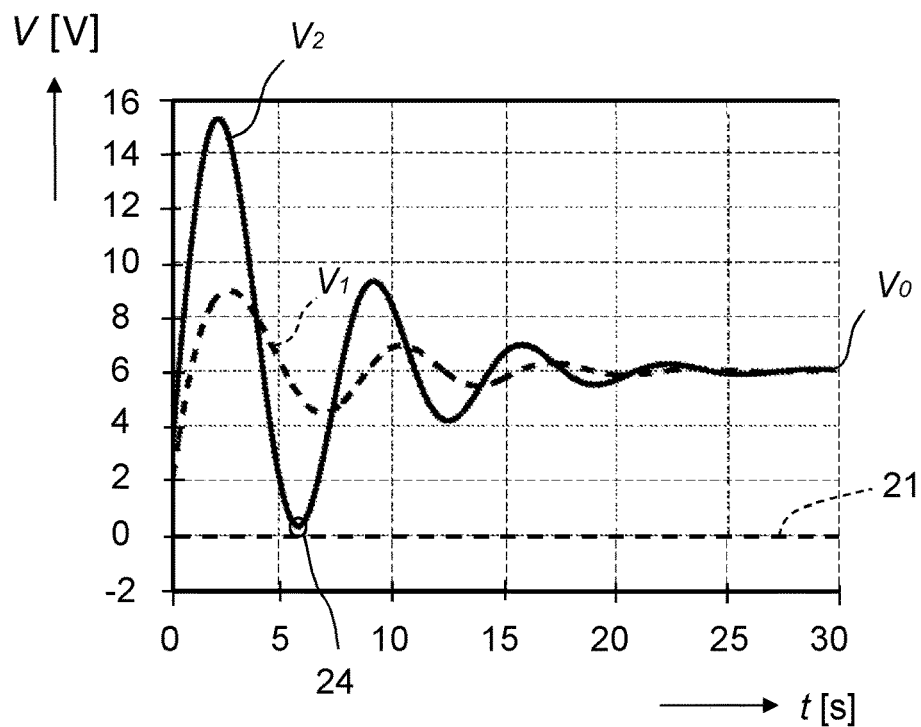
FIG. 5 shows simulated time behaviour of the rotational speed of the drive system and the bottom hole assembly obtained for the model of FIG. 3 for a transition from stick mode to slip mode for system settings in accordance with the invention.

FIG. 5 shows a simulated time behaviour of the rotational speed of the drive system $V_1$, i.e. the dashed line, and the bottom hole assembly $V_2$, the solid line, obtained for the model of FIG. 3 for a transition from stick mode to slip mode for the same system settings and loadings of the elements of the model as in FIG. 4, i.e. a current of 10 kA applied in the inductor L2. The reference rotational speed $\omega_0$ of the speed controller 20 is now set at 6 rad/s, i.e. $V_0=6$ V.

From this simulation, one can see that the rotational speed of the bottom hole assembly, i.e. $V_2$, no longer crosses zero and even remains well above zero. The encircled point 24 of the graph of $V_2$ during the transitional period in FIG. 5 determines the lower limit or critical rotational speed $\omega_c$ of the drive system 15 for which the rotational speed of the bottom hole assembly 11 does not cross the zero line 21.

With the settings and equivalent circuit diagram outlined above, by operating the speed controller 20 at a critical rotational speed $\omega_c$ equal to a minimum reference rotational speed $\omega_0=6$ rad/sec, for example, the rotational speed $\omega_b$ of the bottom hole assembly 11 is kept sufficiently high to prevent the borehole equipment from entering a stick-slip mode.

Figure 6:
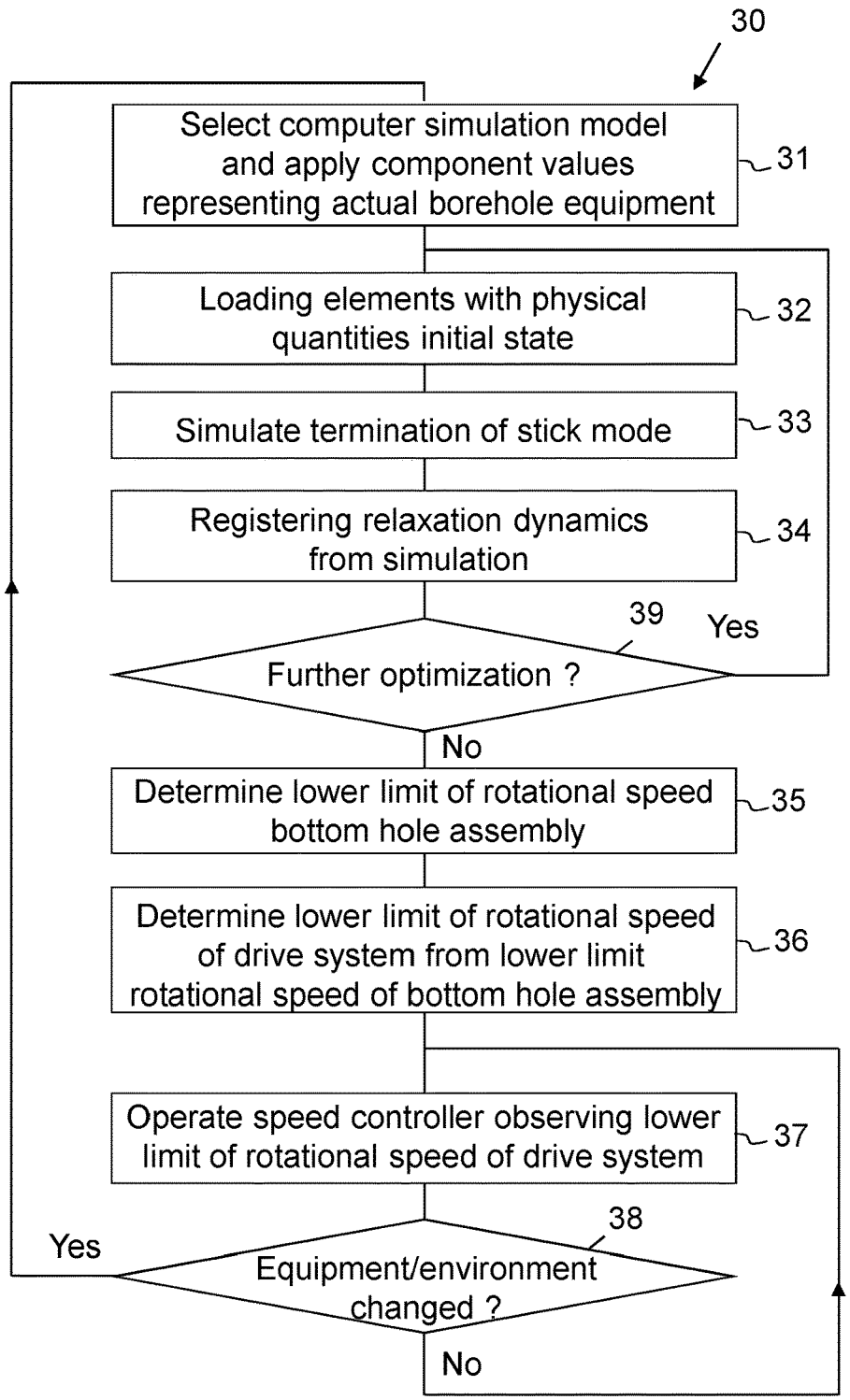
FIG. 6 shows a simplified flow chart diagram for determining the critical speed in accordance with the invention.

The steps for determining the lower limit of the rotational speed of the drive system, i.e. the critical speed, as disclosed above are schematically illustrated in FIG. 6 by a flow chart diagram 30 of the method according to the invention. The direction of flow is assumed from the top to the bottom of the sheet. Other directions are indicated by a respective arrow.

As a first step, the borehole equipment 10 for drilling a borehole in an earth formation is modelled by an equivalent computational model for computer simulation, i.e. block 31 "Select computer simulation model and apply component values representing actual borehole equipment".

The borehole equipment comprises several parts, among which the drill string 12, the bottom hole assembly 11, the rotational drive system 15, and the speed controller 20 for controlling the rotational speed of the drill bit 17. The selected model comprises elements representing an actual mechanical and physical behaviour of this borehole equipment 10 and each component of the model is assigned a value that corresponds to the mechanical and physical properties of the part of the borehole equipment that the respective component represents. In a preferred embodiment, the model is a linear electrical equivalent circuit diagram of the type shown in FIG. 3 by which the time behaviour of the rotational speed of the borehole assembly 11 can be determined in function of the operation of the speed controller 20 and the rotational speed of the drive system 15.

Next, as shown by block 32, "Loading elements with physical quantities initial state", each component of the model is assigned a value that corresponds to an initial condition. In this case an initial condition is loaded corresponding to the mechanical and physical state of the borehole equipment just before the break-loose moment of the bottom hole assembly 11.

With block 33, "Simulate termination of stick mode", the break-loose moment, i.e. the termination of the stick mode, is simulated in the model. As disclosed above with reference to FIG. 3, such a simulation may comprise opening of the switch S from its closed, i.e. current conducting state, to an open or non-current conducting state. This causes a step response behaviour in the model equivalent to a stepwise change of BHA's acceleration. As soon as the BHA speed exceeds the top drive speed, the drill string torque will start to decrease.

As illustrated above in FIGS. 4 and 5, for example, the simulation model using the appropriate initial conditions is very suitable for simulating the dynamics of the bottom hole assembly 11, directly after the break-loose moment. Although a graphical recording of, for example, the rotational speed of the bottom hole assembly and the drive system is shown in these figures, a numerical or other representation of the response may be provided as well. Block 34 "Registering relaxation dynamics from simulation".

From the registered relaxation dynamics representing the rotational drive speed of the bottom hole assembly, the lower limit of the undershoot is determined. In a graphical representation of the time response this is the lowest value of the dynamics curve, i.e. the positions 23 and 24 of the curve V2 in FIG. 3. Block 35 "Determine lower limit of rotational speed bottom hole assembly".

The minimum rotational speed or critical speed of the drive system 15 preventing the rotational speed of the bottom hole assembly 11 becoming zero or below zero, is now determined from the recorded relaxation dynamics, block 36 "Determine lower limit of rotational speed of drive system from lower limit rotational speed bottom hole assembly".

The borehole equipment, i.e. the speed controller 20 while observing the critical speed as determined above, is operated such that the rotational speed of the drive system 15 remains above the lower limit. Block 37 "Operate speed controller observing lower limit of rotational speed of drive system".

During drilling, the drill string 12 will be extended by more drill pipes and the direction of the drill bit and material properties of the earth formation encountered may change and, accordingly, the critical speed of the drive system.

Decision block 38 "Equipment/environment changed?" provides for such changing conditions. In the affirmative, outcome "Yes" of decision block 38, the critical speed will be determined for the changed conditions, i.e. steps 31-37. If the change in the borehole equipment is still too little to justify a new determination of the critical speed, i.e. outcome "No" of block 38, the borehole equipment will continue the drilling of the borehole with the set drive speed, i.e. in accordance with block 37.

A decision whether to determine again the critical speed may be based, for example, on sensed values of the length of the drill string 12, when entering a stick-mode and changes in the weight-on-bit that has to be applied at the drill string to have a smooth drilling operation, for example.

Before or at determining the lower drive speed limit in block 35, 36 an optimization may be applied by reiterating the loading, simulation and registering steps in blocks 32, 33, 34 using adapted physical quantities and model parameters, as illustrated by decision block 39, "Further optimization?", outcome "Yes".

Figure 7:
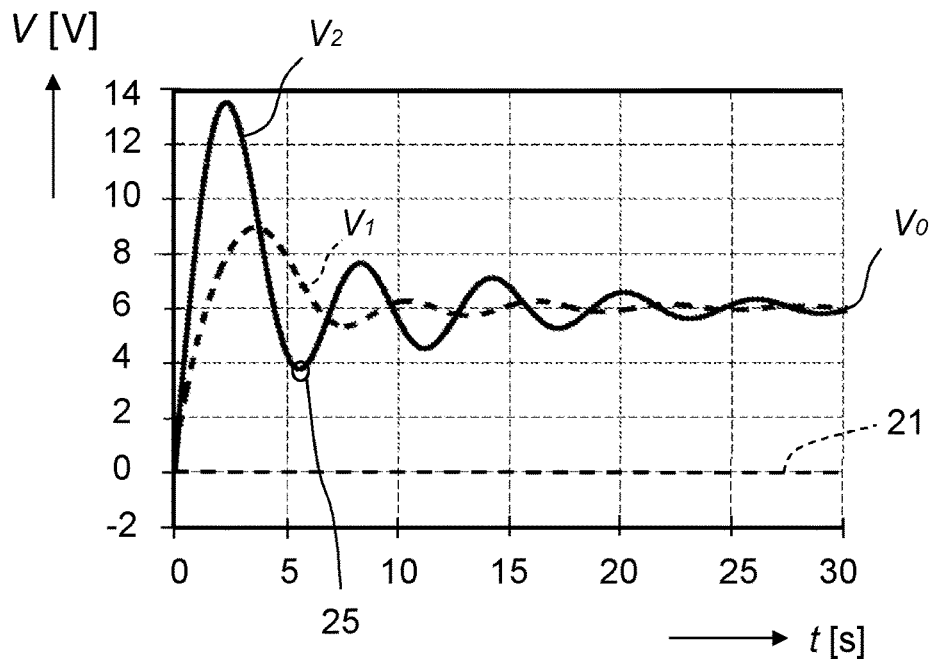
FIG. 7 show simulated time behaviour of the rotational speed of the drive system and the bottom hole assembly obtained for the model of FIG. 3 for a transition from stick mode to slip mode, obtained for different system settings in accordance with the invention.

FIG. 7 shows a simulated time behaviour of the rotational speed of the drive system $V_1$, i.e. the dashed line, and the rotational speed of the bottom hole assembly $V_2$, the solid line, obtained for the model of FIG. 3 for a transition from stick mode to slip mode for the same system settings as in FIG. 5, however with a higher value of $L_1=0.001$ H, i.e. a reduced stiffness of the PI controller $K_I=1000$ Nm/rad.

As can be observed, a lower value of $K_I$, i.e. a decreased I-action provided by the speed controller 20, results in a less steeper dynamic response of the rotational speed of the bottom hole assembly 11, that is a much reduced undershoot in the value of the voltage $V_2$ and, accordingly, a much reduced critical speed of the drive system 15 to keep the encircled point 25 of the graph of $V_2$ above zero. That is, in the simulation of FIG. 7 a reference rotational speed of about $\omega_0=3$ rad/sec is sufficient to avoid a rotational speed of the bottom hole assembly near zero or even becoming zero.

From FIG. 7 it will be appreciated that if the speed controller 20 comprises a PI controller, having a proportional action, P, and an integral action, I, by decreasing the integral action the critical speed can be reduced while drilling a borehole by the borehole equipment, for effectively mitigating stick-slip oscillations at a reduced operating rotational speed.

In practice, however, operators of drilling equipment try to maintain an as much as possible stable drilling operation, which implies as less as possible adaptations to set parameters of the speed controller and an as short as possible settling time of the borehole equipment to its steady state after a break-loose moment. Further, operators would like to operate the drilling equipment over an as large as possible rotational speed range of the drive system, the upper limit of which is determined by mechanical limitations of the drive system and the lower limit of which is determined by the critical speed, as outlined above.

Figure 8:
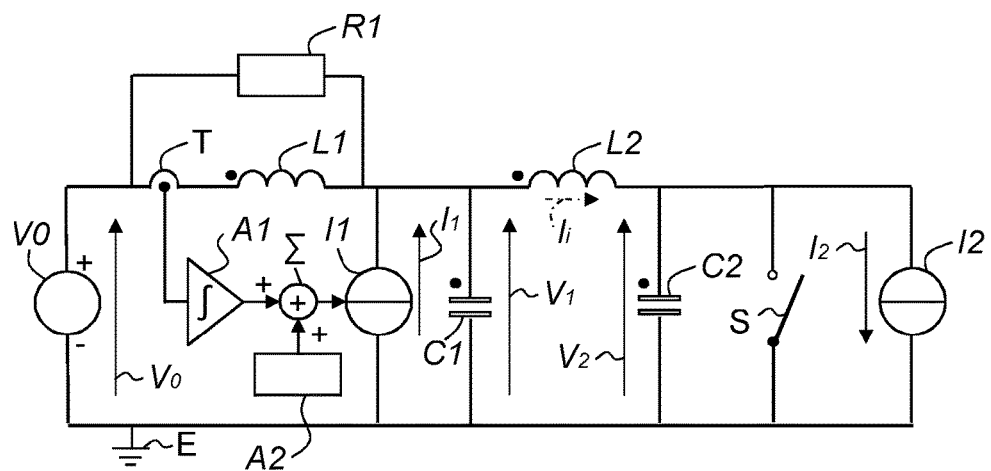
FIG. 8 is a schematic electrical equivalent circuit diagram forming a computational model for computer simulation of a stick-slip condition of the borehole equipment of FIG. 1 in accordance with the invention, comprising additional integral action.

To obtain both, a reduced settling time and a wide range of rotational speeds of the drive system while mitigating stick-slip oscillations, in the equivalent circuit diagram of FIG. 8 an additional integral action of the speed controller is simulated. This additional integral action is represented by an integrator A1, an output of which connects by a summator Σ to the control input of a current source I1, the current $I_1$ of which adds to the current flowing through inductor L2, i.e. the equivalent of the torque in the drill string. For the purpose of modelling, measuring the current through L1 is schematically indicated by current transformer T.

The input of integrator A1 equals the current through L1. The integrator A1 controls I1 such that the current through L1 becomes zero on average, by taking over the average torque in the string from the integral I action. This additional integral action dominantly operates when the torque on the bottom hole assembly 11 increases, i.e. when entering a stick-mode.

When drilling a borehole, the speed controller is operated applying the integral action as simulated in the model of the borehole equipment.

In a further embodiment, also schematically shown in FIG. 8, inertia compensation is implemented, shown by inertia compensator A2. The inertia compensator A2 operates on the acceleration in the rotational speed of the drive system while drilling a borehole by the borehole equipment. The output of inertia compensator A2 controls the current source I1 via the summator Σ.

In use, the inertia compensator A2 controls the current $I_1$ proportional to the acceleration of the drive system 15, i.e. the current through C1, multiplied by a factor, effectively biasing capacitor C1 by a charge Q which has the effect that the effective capacitance of the capacitor C1 reduces.

In mechanical terms, a torque proportional to the acceleration of the drive system 15 is injected at the top end 14 of the drill string 12. This additional torque effectively reduces the inertia of the drive system 15 as experienced by the drill string. Accordingly, inertia compensator A2 provides for inertia reduction of the drive system. A lower inertia will speed up the top drive more quickly at the break-loose moment. The fall in tension in the drill string will thus be limited.

When drilling a borehole, the speed controller is operated applying the further additional integral action as simulated in the model of the borehole equipment.

The effect of the additional integral action can be shown by the time response of the rotational speed of the drive system and the rotational speed of the borehole equipment for a plurality of settings of the speed controller.

Figure 9:
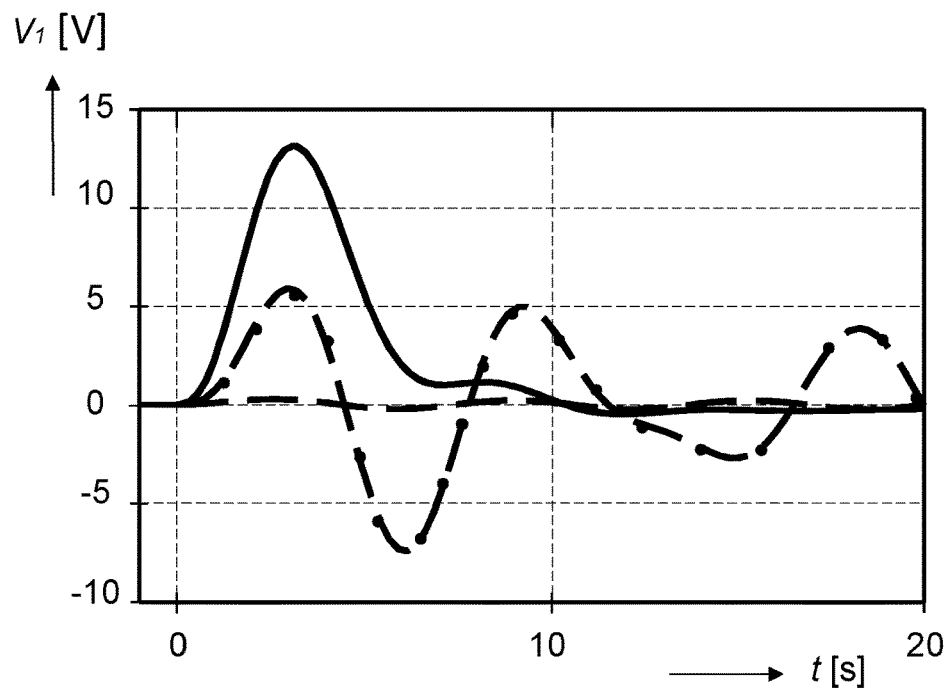
FIG. 9 shows simulated time behaviour of the rotational speed of the drive system obtained for the model of FIG. 8 for a transition from stick mode to slip mode of three simulations.
Figure 10:
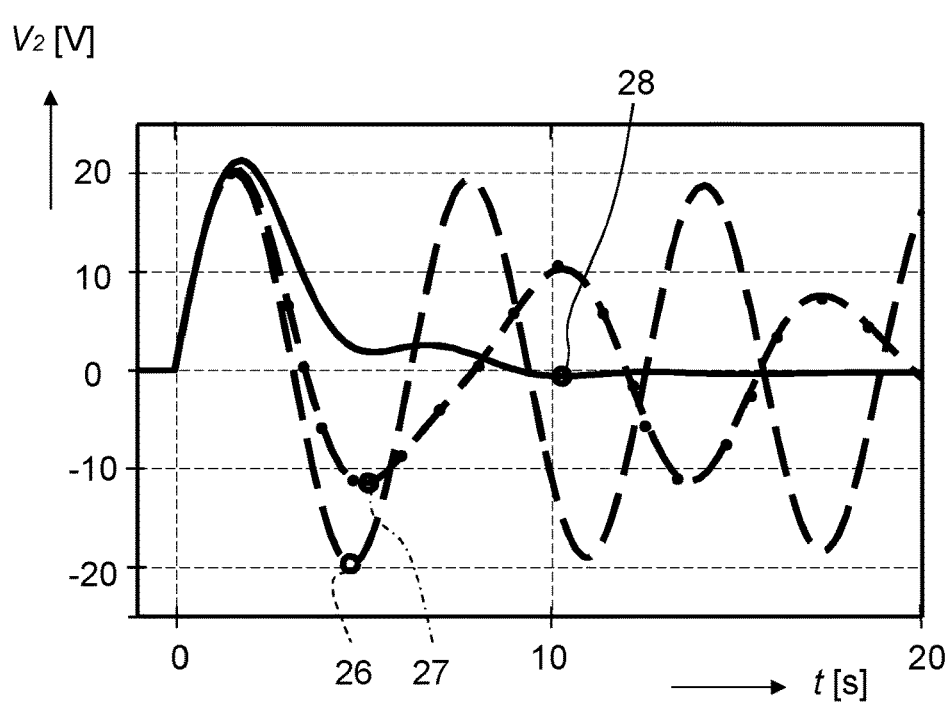
FIG. 10 shows a simulated time behaviour of the rotational speed of the bottom hole assembly obtained for the model of FIG. 8 for a transition from stick mode to slip mode of three simulations.

FIG. 9 shows the time response or relaxation dynamics of the rotational speed of the drive system and FIG. 10 shows the time response or relaxation dynamics of the bottom hole assembly.

The dashed line is the simulated time response for borehole equipment in accordance with the model and loadings of FIG. 3 and a PI speed controller with component settings:
$C_1=2000$ F$\div J_d=2000$ kgm$^2$
$C_2=500$ F$\div J_b=500$ kgm$^2$
$L_1=0.00005$ H$\div K_f=20$ kNm/rad
$L_2=0.002$ H$\div K_s=500$ Nm/rad
$R_1=0.00005\Omega\div C_p=20$ kNms/rad The dashed-dotted line is a simulated time response for borehole equipment in accordance with a commercially available prior art method of controlling the speed controller, known as SOFT TORQUE®, disclosed by U.S. Pat. No. 5,117,926. The relative component settings compared to the circuit diagram of FIG. 3 are:
$C_1=2000$ F$\div J_d=2000$ kgm$^2$
$C_2=500$ F$\div J_b=500$ kgm$^2$
$L_1=0.0005$ H$\div K_f=2000$ Nm/rad
$L_2=0.002$ H$\div K_s=500$ Nm/rad
$R_1=0.0022\Omega\div C_p=450$ Nms/rad The solid line is a simulated time response for borehole equipment in accordance with the model of FIG. 3 and a PII speed controller comprising the additional integral action provided by the integrator A1 and the inertia compensator A2, operative as described above. The effective component settings as a result of the additional integral actions operative at the break-loose moment are:
$C_1=500$ F$\div J_d=500$ kgm$^2$
$C_2=500$ F$\div J_b=500$ kgm$^2$
$L_1=0.004$ H$\div K_f=250$ Nm/rad
$L_2=0.002$ H$\div K_s=500$ Nm/rad
$R_1=0.00118\Omega\div C_p=850$ Nms/rad In mechanical terms, the dashed line represents a very stiff drive system. The dashed-dotted line represents a drive system with feedback based on the motor current (torque) of the drive system, and the solid represent a compensated drive system in accordance with the invention.

In both simulations as shown in FIG. 9 and FIG. 10, in accordance with the invention, it is assumed that the drill spring 12 is pre-wound with an initial condition that represents a torque on the bottom hole assembly of 10 kNm, just before the stick mode terminates and transits into the slip mode. In the tuned electrical model of FIG. 3 this is represented by an initial current of 10 kA in L1 and L2.

In FIG. 10 the lowest value of the simulated rotational speed of the bottom hole assembly for the three simulations is marked by a circle, indicated by reference numerals 26, 27, 28 for the dashed, dashed-dotted and solid line curves, respectively. As disclosed above, these lowest values represent the critical speed of the drive system required to keep these points 26, 27, 28 above zero in the event of a release from the stick-mode.

The stiff case, i.e. the dashed curve, requires a rotational speed of the drive system above approx. 19.6 rad/s. The SOFT TORQUE® case has a critical speed of 11.4 rad/s and the compensated case according to the invention only requires a minimum rotational drive speed of 0.6 rad/s to be able to recover from a stick-slip situation under the system assumptions used.

From FIG. 9 and FIG. 10 one can see the very fast recovery, i.e. very short transitional time of the compensated system in accordance with invention, i.e. the solid line, compared to the other settings. In particular the action of the additional integrator A1 supports to reach the break-loose torque in stick-mode much faster without sacrificing the critical speed. The inertia compensator A2 helps to speed up the drive system as shown in FIG. 9, keeping the critical speed sufficiently low, such that the borehole equipment is able to operate over a wide rotational speed range.

Figure 11:
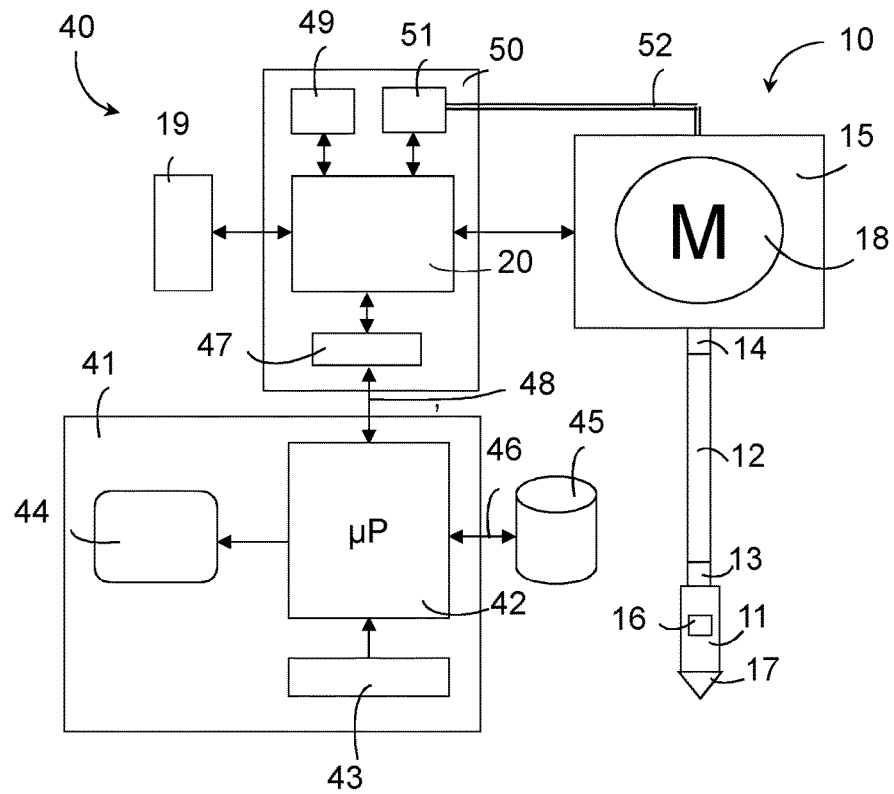
FIG. 11 is a schematic representation of borehole equipment equipped and operating in accordance with the invention, having an electronic PII controller for controlling rotational speed of the drive system.

FIG. 11 schematically shows a device 40 for mitigating stick-slip oscillations in borehole equipment 10 while drilling a borehole in an earth formation in accordance with the invention. In addition to the borehole equipment 10 shown in FIG. 1, a system for computer simulation 41 is provided. The simulation system 41 comprises a computer or processing device 42, an input interface 43, such as keyboard, a touch screen or the like, for selecting a computer simulation model of the borehole equipment and for setting parameter values initial values for simulating the operation of the drive system 15 and bottom hole assembly 11 of the borehole equipment 10. The simulated time response of the borehole equipment is provided at an output interface 44, such as a graphical display, a printer or plotter, or a data evaluation module for evaluating the simulated response, to provide the critical speed of the borehole equipment. The simulation model, parameter and initial values and simulated responses and other relevant data for determining the critical speed in accordance with the invention can also be stored at and retrieved from a separate database 45, accessible from the simulation system 41. The database 45 may be remote from the simulation system and connected by a communication network 46, for example.

The simulation system 41 comprises suitable software and hardware arranged for modelling the borehole equipment 10 by a computational model for computer simulation; simulating in this model a stick mode of the bottom hole assembly 11, and applying physical quantities to the model representing an initial state of the borehole equipment 10 prior to a slip mode; simulating in the model a slip mode of the bottom hole assembly 11 by terminating the stick mode, and determining from this simulation of the slip mode a lower limit of the rotational speed of the drive system 15 for which the bottom hole assembly 11 rotates in a same direction, i.e. does not reverse its rotation direction and maintains a rotational speed above zero.

An electronic controller 50 in accordance with the invention comprises, besides the speed controller 20, a speed limiting device 47 having a memory for storing a lower limit, i.e. the critical rotational speed of the drive system obtained from the time response simulation by the simulation system 41, as outlined above. The electronic controller 50 connects to the simulation system 41 by a data connection or telecommunication network 48.

The electronic controller 50 can be designed as an electronic PI controller or as a PI controller with a control unit 49 providing an additional integral action, operating in accordance with the integrator A1 disclosed above. In an embodiment, an inertia compensator 51 is also implemented in the speed controller 50 and arranged for operating dependent on the acceleration of the drive motor 18, as shown by a double line 52, and discussed with reference to FIG. 8. The speed controller 50 as whole may be implemented as a PII controller.

In the equivalent circuit diagram of FIG. 3 the drill string is modelled by a single inductor L2, connected as shown. For the purpose of the invention, different sections of the drill string may be modelled by an inductor L having a suitable inductance value and a capacitor C having a suitable capacitance value representing some inertia of the drill string, for example, wherein the inductor L series connects to the inductor L2 and the capacitor C connects from the connection node of L2 and L to ground or earth E. Several such sections may be modelled, taking into account different earth formation properties, the path of the drill string in the earth formation, the mechanical properties of the drill pipes, etc.

When loading an initial condition in the elements of the model of the borehole equipment, one may apply different initial currents in the several inductors L, L2, A1 and may charge the capacitor(s) C accordingly to an initial voltage if required.

Further, as will be appreciated by those skilled in the art, the method, device and electric controller according to the invention as described above, provide for studying the effect on the operation of the borehole equipment of several parameter settings and initial values and physical quantities applied. This to determine optimal parameter settings of the electronic controller for achieving a desired behaviour of the borehole equipment while drilling a borehole, in particular for mitigating stick-slip oscillations.

Those skilled in the art will appreciate that the bottom hole assembly and the drive system may be modelled and the respective circuit elements may be loaded with suitable physical quantities, i.e. current and charge, for simulating a respective initial condition in more detail as well.

Accordingly, the present invention is not limited to the embodiments as disclosed above, and can be modified and enhanced by those skilled in the art beyond the scope of the present invention as disclosed in the appended claims without having to apply inventive skills.

The invention claimed is:

1. A method of mitigating stick-slip oscillations in borehole equipment for drilling a borehole in an earth formation, said borehole equipment comprising a drill string having a bottom hole assembly and a top end coupled to a rotational drive system, and a speed controller for controlling rotational drive speed of said drive system, the method comprising the steps of:
    operating said speed controller such that said drive speed is above a lower drive speed limit, that has a non-zero value, while drilling a borehole by said borehole equipment, wherein said lower drive speed limit is determined from:
    modelling said borehole equipment by an equivalent computational model for computer simulation,
    loading elements of said model with physical quantities representing an initial state of said borehole equipment causing a transition of said bottom hole assembly from stick mode to slip mode,
    simulating in said loaded model a transition representative of said transition of said bottom hole assembly from stick mode to slip mode,
    registering time domain relaxation dynamics in said model from said simulating step, thereby obtaining a time response of a rotational driven speed of said bottom hole assembly comprising a transitional phase and a steady state phase, and
    determining from said time response of the time domain relaxation dynamics said lower drive speed limit as a drive speeder at, or below, which said rotational driven speed of said bottom hole assembly reaches a value of zero during one or more portions of the transitional phase,
    wherein the modelling comprises modelling of each of the drill string, the bottom hole assembly, the rotational drive system, and the speed controller by a respective equivalent computational model for computer simulation, and
    wherein the loading of the elements includes loading of each of the respective equivalent computational model with a respective physical quantity representing the initial state of the borehole equipment.

2. The method according to claim 1, wherein said simulating step comprises applying a step response from said loaded model representative of said transition of said bottom hole assembly from stick mode to slip mode.

3. The method according to claim 1, wherein said speed controller is operated such that said drive speed during steady operation of said drive system is as low as possible above said lower drive speed limit.

4. The method according to claim 1, wherein said physical quantities representing said initial state of said borehole equipment comprise a pre-wound drill string as a result of a stick mode of said bottom hole assembly.

5. The method according to claim 1, wherein said modelling includes representation of an actual earth formation and drilling fluid in which said borehole is drilled.

6. The method according to claim 1, wherein said model is an electrical equivalent circuit diagram, a state-space model or dynamic simulation model.

7. The method according to claim 1, wherein said determining of said lower drive speed limit is repeated after part of said borehole equipment has been modified.

8. The method according to claim 1, wherein said speed controller comprises a PI controller, having a proportional action, P, and an integral action, I, wherein said P and I are set such to decrease said lower drive speed limit when applying said step response, and operating said speed controller applying said set integral action while drilling a borehole by said borehole equipment.

9. The method according to claim 8, wherein said speed controller comprises an additional integral action, wherein said additional integral action is set such to speed up settling of said driven speed of said bottom hole assembly when applying said step response, and operating said speed controller applying said integral action while drilling a borehole by said borehole equipment.

10. The method according to claim 9, wherein said additional integral action is set proportional to a spring-constant or spring stiffness of said drill string modelled as a torsional spring.

11. The method according to claim 8, wherein said speed controller comprises inertia compensation, said inertia compensation operates on acceleration in the drive speed of said drive system for providing inertia compensation of said drive system while drilling a borehole by said borehole equipment.

12. The method according to claim 1, wherein said steps of modelling, loading, simulating, registering, and determining are performed in a system for computer simulation separate from said borehole equipment.

13. The method according to claim 1, wherein the equivalent computation model comprises:
- an inductor (L2) that models the drill string;
- a voltage (V2), a capacitor (C2), and a current source (12), that model the bottom hole assembly;
- a voltage (V1) and a capacitor (C1), that model the rotational drive system;
- a voltage source (V0), an inductor (L1), and a resistor (R1), that model the speed controller;
- a respective voltage that models a respective speed; and
- a switch that models the transition from stick mode to slip mode by a state of the switch.

14. A device for mitigating stick-slip oscillations in borehole equipment for drilling a borehole in an earth formation, said borehole equipment comprising a drill string having a bottom hole assembly and a top end coupled to a rotational drive system, said device comprising a speed controller for controlling rotational drive speed of said rotational drive system and supplying a reference-torque to said drive system, wherein said speed controller is arranged for operating said drive system such that said drive speed is above a lower drive speed limit, that has a non-zero value, while drilling a borehole by said borehole equipment and further comprising a system for computer simulation arranged for:
- modelling said borehole equipment by an equivalent computational model for computer simulation,
- loading elements of said model with physical quantities representing an initial state of said borehole equipment causing a transition of said bottom hole assembly from stick mode to slip mode,
- simulating in said loaded model a transition representative of said transition of said bottom hole assembly from stick mode to slip mode,
- registering time domain relaxation dynamics in said model from said simulating step, thereby obtaining a time response of a rotational driven speed of said bottom hole assembly comprising a transitional phase and a steady state phase, and
- determining from said time response of the time domain relaxation dynamics said lower drive speed limit as a drive speeder at, or below, which said rotational driven speed of said bottom hole assembly reaches a value of zero during one or more portions of the transitional phase wherein the modelling comprises modelling of each of the drill string, the bottom hole assembly, the rotational drive system, and the speed controller by a respective equivalent computational model for computer simulation, and wherein the loading of the elements includes loading of each of the respective equivalent computational model with a respective physical quantity representing the initial state of the borehole equipment.

15. The device according to claim 14, wherein said speed controller comprises a PI controller, having a proportional action, P, and an integral action, I, and a control unit providing an additional integral action for operating said drive system to speed up settling of said driven speed of said bottom hole assembly while drilling a borehole by said borehole equipment.

16. The device according to claim 15, wherein said speed controller is an electronic controller implemented as a PII controller.

17. The device according to claim 14, wherein said speed controller comprises an inertia compensator arranged to operate on acceleration in the drive speed of the drive system for providing inertia compensation of said drive system while drilling a borehole by said borehole equipment.

18. The device according to claim 14, wherein said electronic controller comprises a drive speed limiting device having a memory for storing said obtained lower drive speed limit.

19. The device according to claim 14, wherein said system for computer simulation is remote from and communicatively connected to said speed controller.

20. An electronic controller for controlling rotational drive speed of a rotational drive system in borehole equipment for mitigating stick-slip oscillations in said borehole equipment for drilling a borehole in an earth formation, said borehole equipment comprising a drill string having a bottom hole assembly and a top end coupled to said rotational drive system, wherein said electronic controller comprises a drive speed limiting device having a memory for storing a lower drive speed limit of said drive speed, the lower drive speed having a non-zero value that is obtained from;
- modelling said borehole equipment by an equivalent computational model for computer simulation,
- loading elements of said model with physical quantities representing an initial state of said borehole equipment causing a transition of said bottom hole assembly from stick mode to slip mode,
- simulating in said loaded model a transition representative of said transition of said bottom hole assembly from stick mode to slip mode,
- registering time domain relaxation dynamics in said model from said simulating step, thereby obtaining a time response of a rotational driven speed of said bottom hole assembly comprising a transitional phase and a steady state phase, and
- determining from said time response of the time domain relaxation dynamics said lower drive speed limit as a drive speed at, or below, which said rotational driven speed of said bottom hole assembly reaches a value of zero during one or more portions of the transitional phase wherein the modelling comprises modelling of each of the drill string, the bottom hole assembly, the rotational drive system, and the speed controller by a respective equivalent computational model for computer simulation, and wherein the loading of the elements includes loading of each of the respective equivalent computational model with a respective physical quantity representing the initial state of the borehole equipment.

21. The electronic controller according to claim 20, comprising a PI controller, having a proportional action, P, and an integral action, I, for operating said drive system, and comprising at least one of a control unit providing an additional integral action for operating said drive system to speed up settling of said driven speed of said bottom hole assembly when entering a stick mode from a slip mode, and an inertia compensator arranged to operate on acceleration in the drive speed of said drive system for providing inertia compensation of said drive system, while drilling a borehole by said borehole equipment.

22. The electronic controller according to claim 21, wherein said electronic controller is implemented as a PII controller.

23. Borehole equipment arranged for mitigating stick-slip oscillations in drilling a borehole in an earth formation, said borehole equipment comprising a rotational drive system, a drill string having a bottom hole assembly and a top end coupled to said rotational drive system, and a speed controller for controlling rotational drive speed of said rotational drive system, wherein said speed controller is arranged for operating said drive system such that said drive speed is above a lower drive speed limit while drilling a borehole by said borehole equipment, said lower drive speed limit having a non-zero value and being obtained from a system for computer simulation arranged for:
- modelling said borehole equipment by an equivalent computational model for computer simulation,
- loading elements of said model with physical quantities representing an initial state of said borehole equipment causing a transition of said bottom hole assembly from stick mode to slip mode,
- simulating in said loaded model a transition representative of said transition of said bottom hole assembly from stick mode to slip mode,
- registering time domain relaxation dynamics in said model from said simulating step, thereby obtaining a time response of a rotational driven speed of said bottom hole assembly comprising a transitional phase and a steady state phase, and
- determining from said time response of the time domain relaxation dynamics said lower drive speed limit as a drive speeder at, or below, which said rotational driven speed of said bottom hole assembly reached a value of zero during one or more portions of the transitional phase
- wherein the modelling comprises modelling of each of the drill string, the bottom hole assembly, the rotational drive system, and the speed controller by a respective equivalent computational model for computer simulation, and
- wherein the loading of the elements includes loading of each of the respective equivalent computational model with a respective physical quantity representing the initial state of the borehole equipment.

24. A system for computer simulation, arranged for obtaining a lower drive speed limit of a rotational drive system in borehole equipment for mitigating stick-slip oscillations in said borehole equipment for drilling a borehole in an earth formation, said borehole equipment comprising a drill string having a bottom hole assembly and a top end coupled to said rotational drive system, and a speed controller for controlling rotational drive speed of said rotational drive system such that said drive speed is above said lower drive speed limit, the lower drive speed limit having a non-zero value, while drilling a borehole by said borehole equipment, said system for computer simulation comprises a computer or processing device having computer program software arranged for:
- modelling said borehole equipment by an equivalent computational model for computer simulation,
- loading elements of said model with physical quantities representing an initial state of said borehole equipment causing a transition of said bottom hole assembly from stick mode to slip mode,
- simulating in said loaded model a transition representative of said transition of said bottom hole assembly from stick mode to slip mode,
- registering time domain relaxation dynamics in said model from said simulating step, thereby obtaining a time response of a rotational driven speed of said bottom hole assembly comprising a transitional phase and a steady state phase, and
- determining from said time response of the time domain relaxation dynamics said lower drive speed limit as a drive speeder at, or below, which said rotational driven speed of said bottom hole assembly reaches a value of zero during one or more portions of the transitional phase
- wherein the modelling comprises modelling of each of the drill string, the bottom hole assembly, the rotational drive system, and the speed controller by a respective equivalent computational model for computer simulation, and
- wherein the loading of the elements includes loading of each of the respective equivalent computational model with a respective physical quantity representing the initial state of the borehole equipment.

25. The system according to claim 24, comprising an input interface for selecting a computer simulation model of said borehole equipment and for loading elements of said selected simulation model with physical quantities representing an initial state of said borehole equipment causing a transition from stick mode to slip mode, an output interface and a data evaluation module for evaluating a response of said loaded model for a simulated transition of said borehole equipment from stick mode to slip mode, for providing said lower drive speed limit.

26. The system according to claim 25, communicatively connected to a database comprising at least one borehole equipment simulation model, and parameter and initial values for loading elements of a selected simulation model.

* * * * *